US010025797B1

(12) United States Patent
Fonss (10) Patent No.: US 10,025,797 B1
(45) Date of Patent: Jul. 17, 2018

(54) METHOD AND SYSTEM FOR SEPARATING STORAGE AND PROCESS OF A COMPUTERIZED LEDGER FOR IMPROVED FUNCTION

(71) Applicant: True Return Systems LLC, New Canaan, CT (US)

(72) Inventor: Jack Fonss, New Canaan, CT (US)

(73) Assignee: True Return Systems LLC, New Canaan, CT (US)

( * ) Notice: Subject to any disclaimer, the term of this patent is extended or adjusted under 35 U.S.C. 154(b) by 0 days.

(21) Appl. No.: 15/923,317

(22) Filed: Mar. 16, 2018

Related U.S. Application Data (60) Provisional application No. 62/634,321, filed on Feb. 23, 2018.

(51) Int. Cl.
*G06F 17/30* (2006.01)

(52) U.S. Cl.
CPC .. *G06F 17/30194* (2013.01); *G06F 17/30227* (2013.01)

(58) Field of Classification Search
CPC .............. G06F 17/30227; G06F 17/30194
See application file for complete search history.

(56) References Cited

U.S. PATENT DOCUMENTS

| | | | |
|---|---|---|---|
| 2012/0158558 A1* | 6/2012 | Hahn-Carlson | G06Q 10/10 705/30 |
| 2012/0203645 A1* | 8/2012 | Sutter | G06Q 30/04 705/19 |
| 2015/0244804 A1* | 8/2015 | Warfield | H04L 47/6295 709/219 |
| 2017/0046792 A1* | 2/2017 | Haldenby | G06Q 20/0655 |
| 2018/0095662 A1* | 4/2018 | Brennan | G06F 3/061 |
| 2018/0115428 A1* | 4/2018 | Lysenko | H04L 9/3247 |

* cited by examiner

*Primary Examiner* — Leslie Wong
(74) *Attorney, Agent, or Firm* — Lerner, David, Littenberg, Krumholz & Mentlik, LLP (57) ABSTRACT

A non-conventional method and system used with computerized ledgers provides advantages of computing efficiencies, data security, and universal use. The system, method, and computer readable storage medium for storing, creating, monitoring, managing, and modifying measurement, descriptive differences, and parameters of the records of distributed computerized ledgers works through a separation and linkage of stacked modular data storage and processing. Electronic transaction records reside on distributed ledgers and modifying measurement and descriptive differences reside in decentralized or centralized storage, where computers and related networks are improved with increased functionality through increased transaction speeds, decreased data transmissions, increased security, and improved modifiable functionality. The separation of parallel layered storage and modularity of design enable the system to perform a wide range of functionality while maintaining homogeneity with the distributed computerized ledger.

20 Claims, 9 Drawing Sheets

| identifier | timestamp(0) | timestamp(t) | val(0) | val(t) | dif(t) | cond |
|---|---|---|---|---|---|---|
| 0001008 | 1473625547 | 1473725566 | X103 | X107 | Y | NOM |

| 131 | 100.00 | 101.00 | 101.50 | 99.00 |
|---|---|---|---|---|
| 132 |  | 1.00 | 0.50 | -2.50 |
| 133 | 100.00 | 101.00 | 101.50 | 99.00 |
| 134 |  | 0.01000 | 0.0049505 | -0.024631 |

FIG. 14

| VAL | DIF1 | DIF2 |
|---|---|---|
| USD | USD | 10000 |
| EUR | EUR | 01000 |
| JPY | JPY | 00100 |
| CNY | CNY | 00010 |
| GBP | GBP | 00001 |

METHOD AND SYSTEM FOR SEPARATING STORAGE AND PROCESS OF A COMPUTERIZED LEDGER FOR IMPROVED FUNCTION

CROSS-REFERENCE TO RELATED APPLICATION

The present application claims the benefit of the filing date of U.S. Provisional Patent Application No. 62/634,321, filed Feb. 23, 2018, the disclosure of which is hereby incorporated herein by reference.

FIELD OF USE

A novel computer system, network connectivity, and data storage software architecture improves the efficiency, utility and security of a computerized ledger. The disclosed system, method, and computer readable storage medium improve and may be utilized with a wide range of computerized ledgers, including distributed ledgers, decentralized ledgers, and centralized ledgers, where computerized ledgers store and report encrypted, or otherwise secured, electronic transactions, and provide a universal solution to improve the efficiency, utility, and security of computerized ledgers.

BACKGROUND

Generally, computerized ledgers are databases operated on one or more servers by a specialized computer, or operated on a specialized network and controlled by separate computers. A computerized ledger records encrypted or otherwise secured records of transactions, and a computerized ledger can be, among other things, centralized, decentralized, or distributed. Briefly a centralized computerized ledger system is where all nodes connect to a central hub. The management and modifications to the computerized ledger in a centralized environment are generally performed by a centralized computer system and there is usually only one official (or consensus) copy of the computerized ledger. A distributed computerized ledger (DCL) system is where all nodes are independently connected to each other, and the management and modifications to the computerized ledger in a distributed environment are generally performed by separate computers and each computer usually stores its own official copy of the computerized ledger which is proofed for accuracy by a consensus system running on the decentralized network.

The use of distributed computerized ledgers is gaining acceptance and popularity in a number of industrial uses including health care, international trade, and electronic (or crypto) currencies. Distributed ledgers are believed to have a number of advantages over other storage and transaction recording systems. Among the advantages of distributed ledgers are the ability to perform simultaneous updates across multiple fully independent nodes, decreased risk of data loss and corruption through widely distributed consensus-proofed copies, and the ability to create peer-to-peer environments where network validated transactions can be executed with or without a central intermediary. In theory, removing central intermediaries and more directly connecting counterparties through an instantaneous updating and tamper-proof ledger has the promises of improved speed, transparency, and efficiency in related computer systems and networks.

Through supporting systems and internet connectivity, computerized ledgers typically write, encrypt, store, access, and transmit stored and modified records to specialized computers or specialized networks of computers. DCLs are expected to deliver a number of benefits over alternative storage and access systems including, high levels of security, immutability of transaction records, automated integrity processing, and concurrent read/write capability across multiple nodes. While implementations are currently limited, industry forecasters continue to expect DCLs to store and process transactions relating to commercial goods, health records, tangible property, financial instruments, and other items.

Developers of DCL technology face a number of competing tradeoffs and challenges in function and practical implementation. For example, some of these competing tradeoffs and challenges include secrecy of data, privacy of transactions, speed of recording transactions, speed in updating records, speed in storage and transmission, and full security of the transactions record trail. Typically DCLs engage in redundant movement of transaction data on a peer-to-peer basis such that there is independent processing at every relevant node to facilitate different forms of consensus control and audit, often without the services of a central administrator.

One of the most common data structure formats for DCLs is a block format, in which transactions are aggregated and processed within distinct computer timestamp measured periods of time, and where each aggregation of properly authenticated transactions is written to the DCL in the form of an appended block or comparable structure.

Where a DCL relies on multimode consensus, audit trails and sequencing control may include a range of cryptographic techniques including so-called mining processes based on cryptography or processing power (also known as "proof of work") or proof of stake processes based on holders and holdings within the records providing some validation. Even in some of the least data rich DCLs, such as the block chain implementations of cryptocurrencies (including Bitcoin, Ethereum and the like), the computational burden of basic transactional data in DCLs is slowing networks and jeopardizing recordkeeping, accuracy and potential growth. Cryptocurrencies typically contain only the data necessary to maintain transaction records; as industry attempts to expand the types of DCL applications, higher data requirements are certain to further frustrate processing and transmission speeds.

Most decentralized electronic ledgers (including those used for electronic currencies) are limited in functionality in that their representational blocks are homogenous and their use of timestamped sequencing is limited to curing the "double spend" problem; that is, the transacting of a ledger item which has already been transacted. The most promising known solutions to higher functionality involve pushing more data or computer code through already limited blocked data arrangements.

The promise of DCLs is big, but the industry is still challenged by the barebones data requirements of cryptocurrencies; using known techniques including colored coins and smart contracts to put real estate, health records, commercial transactions, and financial instruments on DCLs is likely to exacerbate current speed and block size challenges. The addition of smart contracts is already introducing serious security concerns.

Expanded implementation of DCLs, for example beyond homogeneous block cryptocurrencies, has been slower than many professionals in computer science, government, and commerce had anticipated. The simplified homogeneous blocks of electronic currencies are already proving difficult to transact, transmit, and secure; news reports regularly cite problems including delays in validations and settlements, and excessive transaction costs. Proposed extensions of DCLs are generally directed at techniques such as colored coins and smart contracts, however these types of implementations also have many drawbacks including they will: (i) demand continuously revised and customized systems, (ii) add additional pressure to networks and computer systems relating to processing, storage, and transmission, and (iii) introduce vulnerabilities where operative code or descriptors is openly accessible or widely distributed.

Data heavy DCLs (including colored coins and smart contracts) will have a number of drawbacks including: (i) the need for purpose built architecture, operations, and interfaces for new applications and implementations, (ii) the need to coordinate the storage of application specific data and the operations of that data with all possible contributors and users, and (iii) the technological limitations relating to increasing file and block sizes which hampers processing efficiency, decreases practical applications for many users, and severely limits a universal application approach. For example, bitcoin's architecture of 1 gigabyte block sizing and 10-minute block-creation intervals has created an aggregate block chain size of approximately 150 gigabytes, and transaction frequencies limited to fewer than 10 per second; these limitations inherent in the known DCL architecture preclude or severely limit its use in high frequency applications such as retail sales and financial markets. Some systems designers have proposed "trusted systems" for speeding up transactions in which a parallel transaction settlement system is run in conjunction with the block chain; in these systems a trusted intermediary executes rapid transaction settlements on a centralized network, and then the intermediary's transactions are released in bulk to the distributed ledger.

However, these types of parallel transaction settlement systems are known to have many drawbacks. For example, one drawback is that running two systems in parallel demands twice the resources to accomplish the same work as a single system. Another drawback is that, since input errors are always a possibility, the probability of an error increases because the amount of data being input doubles.

Thus there still remains a need in the art for a system and method that provides the advantages of current such computer ledger systems without the above drawbacks. Furthermore there also remains a need in the art for a system and method that is compatible with current technology.

SUMMARY

The present invention solves the problems of current state of the art and provides many more benefits. The disclosed improves the storage efficiency, computational processing, transmission speeds, and functional utility of distributed computerized ledgers (DCLs). Included in the disclosed embodiment is a multiple, parallel, and modular system of storage and processing used to improve the function of the computers running on a network with a DCL. The DCL industry is trying to achieve the reality of a peer-to-peer distributed ledger with immutable records of transactions, commercial practicality, rapid communication and transaction times, and universal techniques to operate over a wide range of applications. Known DCL systems have largely been directed at very narrow applications of electronic currencies (or cryptocurrencies), and those electronic currency applications have highlighted many limitations in transmission and processing speeds in known DCL formats. The proposed system and method is universally compatible with current technologies as well as compatible with current alternative settlement arrangements.

In addition to the data storage and requirements for customization, the disclosed has an important advantage over smart contract and similar coding solutions relating to security and tampering. Because the known methods of smart contracts and colored coins are based on distributed computer code, they are more subject to error, loss of security, and hacking. The networks over Ethereum block chain implementation based on smart contracts were recently hacked, and implementations based on distributed code are particularly vulnerable (see "The Ether Thief", Bloomberg, Matthew Leising, Jun. 30, 2017). The disclosed eliminates the risks relating to distributed code, and eliminates the customization required to create, store, and operate new functionality.

The disclosed system, method and computer readable storage medium also solves certain internet based challenges not previously addressed in the industry, including expanding the capabilities of computerized ledgers and repurposing existing narrowly specified computerized ledgers through at least one processing engine capable of running and storing results in either a parallel or integrated storage architecture of automated system entries for purposes including the creation of new electronic property types, and improving the speed and security of computer based transactional networks. The disclosed embodiment utilizes unconventional architecture and processes not routinely integrated in computerized ledger systems.

Known and deployed DCLs have been largely limited to cryptocurrencies and limited networks to track the shipment of goods. Importantly, known cryptocurrency DCLs carry no data other than cryptographic markers (sometimes operating as unique block indicators) and transaction records; the unit counts (or ledger entries) are treated as the item of value and there is no other value attribution, linkage, and generally no convertibility into tangible property or items. DCLs directed at trade and shipping reside on very limited networks where a small number of permissioned parties perform simultaneous write and read operations to a shared ledger; these limited networks are generally specially purposed and have limited scalability. While there have been high expectation for banks and financial exchanges to employ DCLs across many businesses, practical development and actual implementations have been surprisingly low. In the recently published journal article, "*Blockchain and Financial Market Innovation*", the Federal Reserve Bank of Chicago Economic Perspectives, Vol. 41, No. 7, 2017, the federal bank writes "In order to achieve their full potential, implementations of block chain technology will likely be accompanied by smart contracts. Smart contracts are legal contracts written in computer code that execute automatically once certain conditions, specified in the contract, are fulfilled. Smart contracts can be added to distributed ledgers to self-execute on the basis of information in the ledger . . . ". The Federal Reserve Bank of Chicago's position is representative of the consensus view that writing more data into a DCL framework is the future of growth and expansion.

The other known method for achieving non-homogeneity in the units of a DCL is called "colored coins". The website bitcoinwiki <https://en.bitcoin.it> defines colored coins as: " . . . a class of methods for representing and managing real world assets on top of the bitcoin block chain. While originally designed to be a currency, Bitcoin's scripting language allows to [sic] store small amounts of metadata on the block chain, which can be used to represent asset manipulation instructions." <https://en.bitcoin.it/wiki/Colored_Coins>. Colored coins are a set of limited and preset encoding techniques for simple re-denominations of coins or for initiating self-executing transfers. The implementation of colored coins puts more overhead demands on already challenged DCL ledger processing by expanding the quantities of redundantly distributed data. Known colored coins are also limited in application, if for no other reason than their data demands become impractical when applied to universal solution sets.

The disclosed embodiment departs from consensus in that it is based on alternative storage processes and architecture. The disclosed embodiment is directed at separating the processes and storage of DCL computers, networks and systems, where only those items required for transaction record keeping are maintained in the fully distributed ledger, and all other data, functionality, and processing is stored in a system of decentralized or centralized storage and processing, linked to the distributed ledger through a combination including timestamps, cryptographic strings, cryptographic nonces, or identifying keys. The disclosed embodiment is directed at a material leap in functionality, utility and speed, and it can be applied to both existing DCL data architectures and newly purposed DCLs. Further, the storage architecture of the disclosed embodiment readily extends to highly efficient mixed real-world use, through a modular system of parallel stored and processed differentials; entirely new applications and enhancements can be added with no additional overhead in the transaction ledgers.

In addition to improving the functionality of the hardware and networking components, the disclosed embodiment is directed at transforming the properties and expanding the functionality entries in a DCL in many unconventional ways. To date DCLs have been limited to currencies of simple multi-node database applications. In order to make DCL technologies widely useful, their underlying entries and transaction records need storage and processing technologies to become representative of, convertible into, or based on real world items of markets and commerce, where those real world items of markets and commerce are represented by a mix of datasets of prices, volumes, dates, settlement particulars and other details. For example, an application of the disclosed embodiment relating to the storage, trade, and transport of steel can carry all of the necessary parameters without additional DCL overhead, where examples of the parameters include: type (carbon, alloy, stainless, tool), grade (SAE—Society of Automotive Engineers codes), application (structural, high tensile, pipe), delivery (date, port), and settlement price and currency (US dollars, Euro, Japanese Yen). Further, the same DCL system design and architecture can immediately accommodate any other application including health care, international trade, or financial instrument applications without recoding or providing for additional overhead.

The Achilles heel of the industry is achieving the combination of speed, functionality, and application versatility, while maintaining the benefits of secure, immutable, and distributed transaction records; the disclosed embodiment solves for the long felt needs of higher efficiency and greater functionality with a new data storage, data processing, and computer functionality. Applied to implementations, the system, method, and computer readable storage medium of the disclosed embodiment are capable of creating entirely new computerized ledger arrangements without additional processing headroom or distributed storage.

The disclosed embodiment employs a non-routine system in which a base DCL, or other computerized ledger, records transactions in sequence; the base computerized ledger transaction records may encrypted and distributed over an internet connected network or encrypted and stored on connected decentralized devices. Among the distinctions between the disclosed embodiment and known and conventional methods is that the disclosed embodiment operates at least one parallel, modular, and separate linked computer storage which accesses one or more exogenous published variables or at least one descriptor difference for the purpose of creating new functionality to a base DCL or other computerized ledger. At least one system created differential is generated from exogenous electronic published data, variables or descriptor, where the time frequency of differential generation and storage (while the electronic published data or variables are changing) is at least as frequent as DCL block creations (or similar transaction recording and sequencing formats) of the base computerized ledger. A system of parallel, modular and separate linked storage of generated differentials expands and redefines the use and application of a base computerized ledger without additional overhead or storage requirements for the base computerized ledger. Transactional records may be transmitted through a network with redundancies, but the differences, measurements, or descriptors are stored in parallel, modular and linked arrangements and not within the transaction records.

The above objects are met by the present invention. In addition the above objects and yet other objects and advantages of the present invention will become apparent from the hereinafter-set forth Brief Description of the Drawings, Detailed Description, and claims appended herewith. These features and other features are described and shown in the following drawings and detailed description.

DETAILED DESCRIPTION

In general, the present invention overcomes the disadvantages of current computer ledgers. In addition, the present invention works in an entirely new and different way than prior attempts to overcome computer ledger drawbacks. The disclosed embodiment is an unconventional system, method, and computer readable storage medium which creates and operates a high efficiency computerized ledger capable of universal application to a range of industrial, commercial and financial implementations. Included in the disclosed embodiment are computer storage, related processes, and methods which change and expand the use and applications of known computerized ledgers. The disclosed embodiment is directed at non-centralized electronic ledgers in which transaction records are distributed to multiple nodes within a network, and where multiple copies of transaction records (in summary or detail) are maintained on separate computers connected to a network. Such non-centralized networks include both decentralized networks and distributed networks, and also include networks in which participants engage in direct or indirect peer-to-peer transactions. The disclosed embodiment improves the functioning of the related computers, computer systems, the network communication equipment and related processes. Further, the disclosed embodiment expands the usefulness and versatility of existing ledgers, transactional storage systems and distributed ledger communication networks.

The disclosed embodiment reduces the storage requirements of known methods, improves network transaction speeds, reduces the amounts of transmitted data relating to transactions, and expands the utility and functionality of computerized ledgers. The detailed embodiments disclosed are examples, and the systems, methods, and computer readable storage medium can be embodied in many forms. The specific design, structure, and method details described herein are not meant to be limiting. In addition, terms and descriptors used herein are not intended to be limiting, but rather to illustrate the concepts.

Computerized ledgers are generally used to record the transaction records of interests or units, where the interests or units are purchased, sold, transferred, conveyed, split or where ownership stakes are otherwise altered. To date, large scale applications of computerized ledgers have been largely limited to electronic or so-called cryptocurrencies. A cryptocurrency operating on a network has extremely limited data demands; coins are identical and fungible, and the only requirement to track movements in the network is a basic sequenced listing record of transactions of the homogeneous units; all units or interests on the DCL network are identical and fungible and require no stored or process descriptors. The DCL has many benefits in the context of a single coin network, in that the ledger can be fully distributed and transparent. Coin based DCL networks track a single transaction type where validation and immutability of the post-validation record trail require basic cryptographic techniques to properly sequence the peer-to-peer transactions. However, as the industry has attempted expansions beyond homogeneous coins, the simple architecture of the basic ledger has introduced limitations. Widely promoted add-ons such as colored coins and smart contracts, are very limited in implementation, require implementation-specific customization, put much larger demands on data transmission and data storage, and introduce unique security risks.

A number of DCLs are currently in implemented as block chain operations over cryptocurrencies. Block chain (or block chain) ledgers are typically DCL formats where transactions are sequenced and bundled into discrete units or blocks, aggregated by time, where the blocks are sequenced through a combination of timestamps and internal generated cryptographic codes. The basic design objectives of the block chain DCLs are to ensure that transactions which get recorded in a block are validated through a consensus process, that blocks are properly sequenced as they are appended onto the chain, and that their sequencing and recording is immutable.

Known computerized ledgers are principally designed and built for electronic currencies, which did not previously exist, and only exist within the framework of the DCL block chain. Known systems and methods have attempted to extend the DCL to other types of items and applications, most of which require a high degree of detailed specification and data overhead. Systems developers are finding that extending the known DCL methods to applications requiring specification requires overly complex bespoke solutions for each application, and that the bespoke solutions create material burdens on networks.

The disclosed embodiment is a departure in systems, storage, method, and data architecture. The disclosed embodiment changes design and methods of data storage and the functionality of a DCL. The disclosed embodiment is partially based on the concepts: (i) electronic transactions within a DCL can be independent and separately processed from the data items required to specify a value, disposition, distribution, or resolution of a unit of the DCL, (ii) direct processing of a DCL and available network and system capacity must be directed at the highest levels of transaction and execution speed, rather than DCL internal specification, and (iii) many real world applications of DCL will relate to already specified real world objects, and the articulation of those items can generally be dynamically imputed to the DCL interests through linked and modular storage systems.

Included in the purposes of the system's separated parallel storage of differentials dynamically linked to a base DCL are a reduction in redundant data transmission and faster processing of transactions; a base DCL can be entirely repurposed through the disclosed embodiment with no increase in base DCL storage requirements or computational overhead. Also included in the purposes of the modular structure of separated parallel storage of differentials is increased utility and functionality of the systems running basic DCLs; the disclosed embodiment can repurpose a base DCL, by creating new electronically tradable items without any customization to the DCL, and the modularity of the disclosed embodiment allows rapid and dynamic changes without increased data transmission or data storage overhead.

Figure 1:
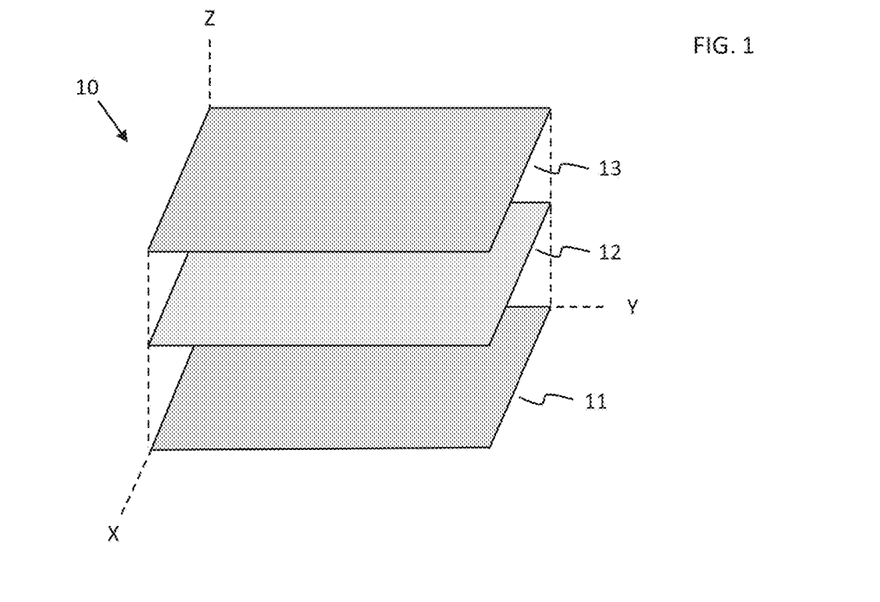
FIG. 1 illustrates one example of data storage and data structure, where a distributed computerized ledger, a time sequence, and parallel storage of difference layers are indicated on the x, y, and z axes.

Beginning with FIG. 1 diagram 10, the diagram is a simplified illustration of system storage. A base electronic computerized ledger 11 is illustrated as the single layer where computerized ledger transaction records are created and modified including the actions of writing, appending, and reading, where the base electronic ledger resides on a distributed or decentralized ledger. All of the transaction records reside on the base electronic ledger 11, and transaction records may be appended to the ledger grouped within blocks or appended individually. Transaction records will be identifiable by at least one of a system timestamp, a network timestamp, a unique system generated identifier, or a cryptographic identifier. When written or appended in groups or blocks, the related group or block and component transaction records may be identified collectively in some implementations (the disclosed embodiment reads and processes transaction record data in time sequenced groups), and may be identified independently in other implementations (the disclosed embodiment reads and processes transaction record data based on individual transactions).

Continuing with FIG. 1 diagram 10, the parallel storage of differences is indicated by parallel storage of difference layer (PSDL) 12 and PSDL 13. An implementation of the system includes at least one PSDL. Each PSDL will store at least one system written and system accessible time sequenced differential or descriptor, where differentials are created by the system from exogenous and electronically published data streams, and where at least one differences processing engine running on the system computes and stores time sequenced differences from values in the published data stream. Differentials recorded on a PSDL may also include descriptive differentials which can indicate difference types, grades, timeframes or other discriminatory identifiers; descriptive differentials may be utilized with or without data stream differentials. In certain implementations, a descriptive differential is an indirect reference to electronically published data streams; for example a descriptive differential which indicates a certain type of steel of a certain grade to a DCL unit imparts a delivery obligation or value which aligns with one or more electronically published data streams.

The differences residing on a PDSL are applied to the units (or interests) of a DCL upon a system occurrence of an action or process including a value polling, a distribution, a resolution or settlement, or other processes requiring the supplementary data in the PSDL. Cryptographic encoding, transaction validation, and consensus proofing process operations on the DCL may or may not access PSDLs. The system may apply each PDSL to the related units in sequence (i.e. PSDL1, then PSDL2) or simultaneously (i.e. PSDL1 and PSDL2 at the same time). Examples of the time sequenced exogenous and electronically published data include: (i) the prices of computer memory storage devices, (ii) prices of crude oil of differing grades, at different delivery points, denominated in different currencies, (iii) voter counts in statewide election by demographic, party affiliation, and geographic location.

Continuing with FIG. 1 diagram 10, in DCL implementations of fully distributed or decentralized transaction record storage, the base electronic computerized ledger 11 may be transmitted across a network of computers, where multiple original copies reside on multiple network nodes. The PDSL data 12 and PSDL data 13 (and related processes) are not distributed to every node within the network, and in certain implementations of the system, all PSDL items and processes are maintained on a centralized devices or limited decentralized storage devices. The system's interaction with and between system's stored data layers, and the modifications to the base DCL ledger units (based on the PSDL data storage) may include any mathematical or logic computer operator or operation.

Figure 2:
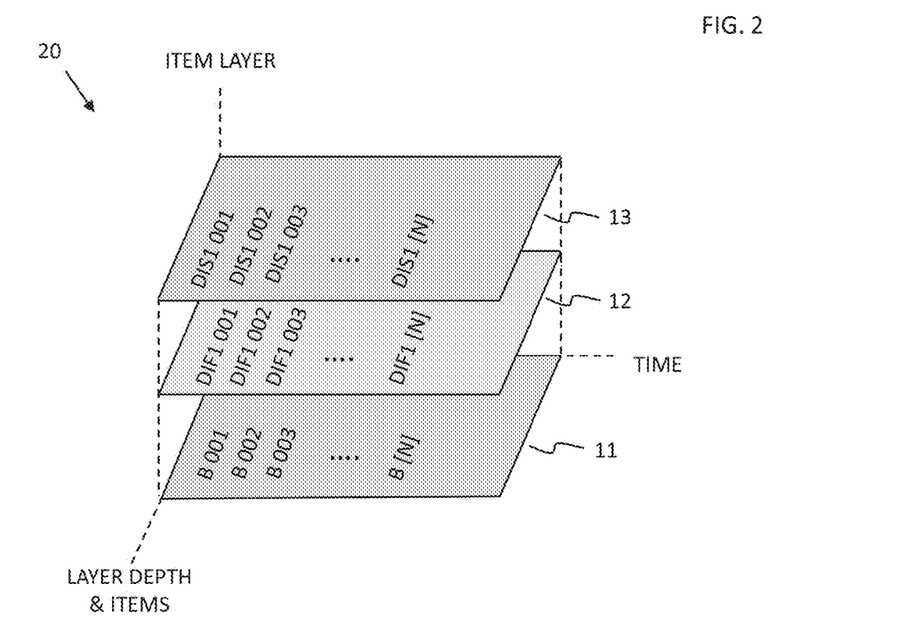
FIG. 2 illustrates one example of the population of data items in the three dimensional storage array.

Moving to FIG. 2 diagram 20, the diagram is an extension of diagram 10, where diagram 20 illustrates an example of recording transaction records to the base DCL (which is distributed with multiple original copies in a distributed or decentralized network), and the simultaneous, advanced, or lagged writing of differences (on the PSDL) from one or more exogenous electronically published internet data streams or descriptors. The modularity of the linked and mixed storage are illustrated within the three dimensional axes of: (x) time as measured by network computer clocks, or other highly accurate timekeeping devices, (y) the layer or depth of items which relates to the content detail of each appended record in the PSDLs 12 and 13, and (z) the changeable number and modularity of layers, where storage layers can be added, removed or otherwise modified, and where such modifications directly interoperate with the base DCL without the addition of network or system overhead, and without the security risks of distributed code. Illustrative detailed examples of transaction records are illustrated on the base DCL, where example appended blocks are denoted as "B", and the values "001" through "N" denote the sequencing of the appended blocks. Illustrative examples of PSDL stored differences are denoted on PSDL 12 and PSDL 13, where "DIF1" and "DIS1" indicate differential items, and the values "001" through "N" illustrate a time alignment of PSDL items with base DCL transaction records.

Figure 3:
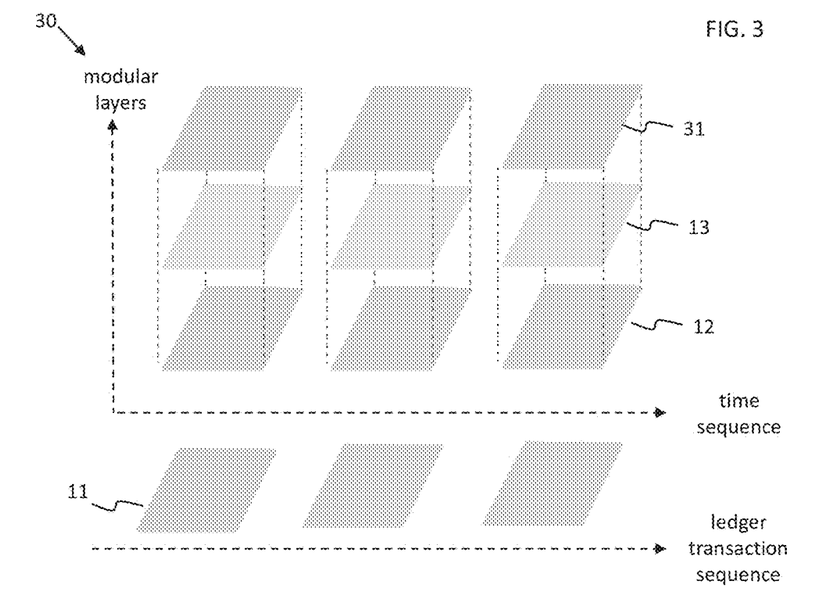
FIG. 3 an example of a data storage array, where the transactional records which are transmitted between and among nodes are distinguished and separated from differential items processed and stored separately from the transactional ledger.

Diagram 30 of FIG. 3 illustrates the system's separation of the base DCL transaction records 11, from the parallel storage of difference layers 12, 13, and 31, where a third storage layer in the PSDL is indicated at 31. Diagram 30 is an example illustration of three separate PSDLs operating over a single base DCL. It can be noted that only the base DCL 11 is redundantly distributed (each may be an original and consensus proofed copy) over individual nodes of the network, while the PSDL data is stored in a centralized or decentralized network. FIG. 3 diagram 30 illustrates an example where multiple modular layers of stored (and operative) differences (the PSDLs) are time sequenced, and where time sequences are aligned with system writing and appending of transaction records in the base DCL individually or in groups (or blocks). Diagram 30 is an example of the modularity of the system and an illustration in the system's efficiency in storage operations. The system's PSDLs are modular, and implementations of the system can create entirely new computerized storage of entirely new functional electronic ledger items using already implemented or new DCLs. Further, because the system separates the storage requirements and computer processing overhead related to the PSDL data, there are no additional DCL storage requirements, and no additional computing overhead on the transaction record keeping network and systems; all while the disclosed embodiment transforms the utility and function of the base DCL.

Referring briefly to FIG. 3, a base computerized ledger is indicated at 11 where appended blocks (of records) or individual records are added to the ledger in sequence (from left to right in the figure). A modular layer one (12), a modular layer two (13), and a modular layer three (31) are system generated stored differentials or descriptors which are collectively applied to the base computerized ledger to create a useful, convertible and real world applications where entries within the computerized ledger 11 can have attributable and constructive discriminatory properties, and where differentials relate to any number of objects or transactions including, shipping records, commodity delivery, or a bespoke financial instrument. The base computerized ledger 11 may be redundantly transmitted and modified across a distributed network similar to the manner in which known electronic currencies operate, but the operative modifying modular layers are generated and stored once or in other limited decentralized distribution, and linked to the base computerized ledger 11 through a computer generated timestamp, a timestamp sequenced key, a unique character string, a cryptographic nonce, or similar unique identifier; records of the modular layers which differ in value or descriptor and time will have a unique alignment with records in the base DCL. Complex and multifactor arrangements may be stored, processed, and transmitted without the introduction of additional overhead in the transacting network and without the customization which is required with the implementation of techniques such as colored coins or smart contracts.

Figure 4:
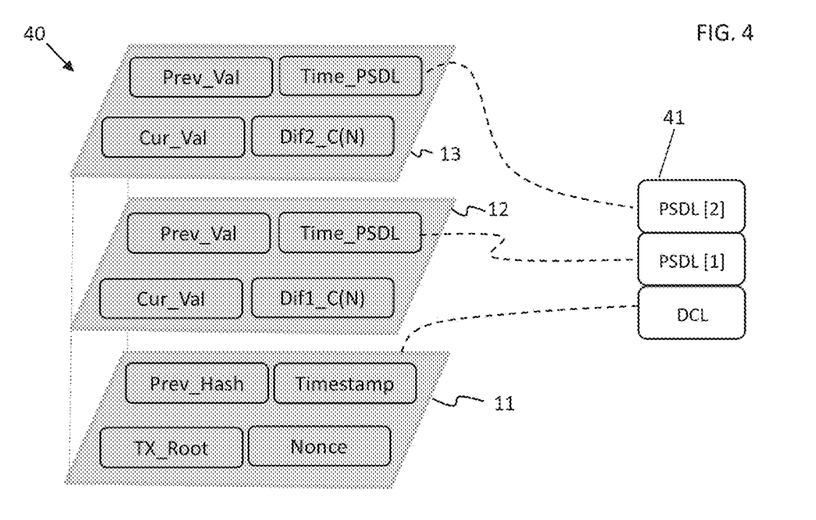
FIG. 4 illustrates an example of electronic linkage between and across a distributed computerized ledger storing transaction records and a related array of centrally or decentralized stored differentials.

FIG. 4, diagram 40 is an illustration of an example of system data linkages of the distributed or decentralized base DCL to the centralized or decentralized PSDL. Beginning with the base DCL 11, basic details relating to a transaction or a group of transactions are indicated in the base DCL diagram 11. Beginning with "Timestamp" and moving clockwise, "Timestamp" is generally a unique entry in the DCL, recording the system time when a block was found (in certain cryptographic mining processes) or recording the system time when one or more transactions are written on or appended to the base DCL dataset. "Nonce" is generally a one-time use number added to a group or block record in certain base DCL applications. The "Nonce" serves many purposes including cryptographic security, immutable record sequencing and it is part of the consensus validation in certain applications involving cryptographic mining. The "Tx_Root" is generally the connection to recorded transactions, and "Prev_Hash" is a hash from the immediately preceding block, which ensures that each block is immutably tied to previous block.

Continuing with FIG. 4 diagram 40, example detail is added to PSDL 12 and PSDL 13. Differing implementations may include different PSDL detail, and importantly, there is no requirement that the data stored in each PSDL be identical. "Time PSDL" is an example of the principle linkage, where the field stores a unique identifier which may be in the form of a string, or value such that the value is linked to a concurrent, delayed, or advanced identifying entry in the DCL. "Dif1_C(N)" is a difference measuring a subject data items over a defined period of time, where "Dif1_C(N)" can be descriptive or arithmetic. "Cur_Val" and "Prev_Val" are descriptive or arithmetic values stored on PSDL 12 and PSDL 13 and relate to exogenous items, where "Prev_Val" indicates the immediately preceding or early system time, and "Cur_Val" indicates a later time or current time. Both the DCL and PSDL have independent record sequences, and each record, block, or transaction within a DCL will have an attribution to a location in the stored PSDL, and the DCL-to-PSDL connector 41 links the distributed DCL to the centralized or decentralized PSDLs based on unique codes, time indicators, or similar items.

Figure 5:
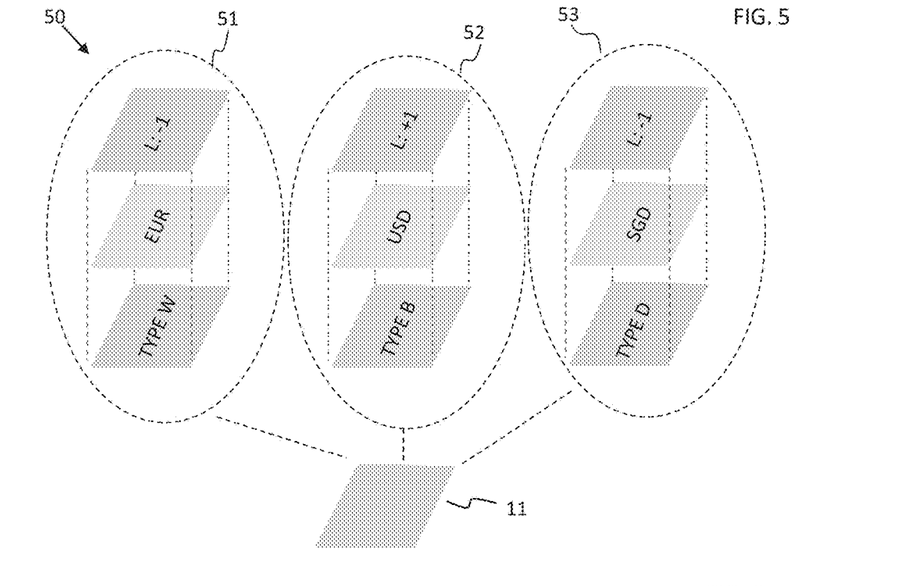
FIG. 5 illustrates an example implementation of a distributed transaction ledger and a mixed type storage array of values and differentials.

FIG. 5 diagram 50 is an example of the increased functionality of a base DCL format through the storage of the disclosed embodiment. Three PSDLs are illustrated as examples relating to using the disclosed embodiment in the context of commodities transport and trade. The base DCL 11 is shown, and the PSDLs 51, 52, and 53 illustrate example specifications for a PSDL linked to the base DCL. In each illustrated example (of three sets of PSDLs), the lower layer indicates a shipped commodity type (Type W, B, and D), the middle layer indicates the currency in the data (EUR=Euro, USD=U.S. Dollar, and SGD=Singapore Dollar), and the topmost layer indicates descriptive differences (−1, +1 and −1, from right to left at 51, 52, and 53 respectively). PSDL 51 is an example where the exogenous data streams are Type W (WTI Crude Oil), and Euro currency (EUR), and a descriptive difference of −1, where −1 may indicate an obligation to deliver WTI Crude Oil denominated in Euros. PSDL 52 is an example where the exogenous data streams are Type B (Brent Crude Oil), and U.S. Dollars currency (USD), and a descriptive difference of +1, where +1 may indicate an obligation (or operative entitlement) to take delivery of Brent Crude Oil denominated in USD. PSDL 53 is an example where the exogenous data streams are Type D (Dubai Crude Oil), and Singapore Dollars currency (SGD), and a descriptive difference of −1, where −1 may indicate an obligation (or operative entitlement) to make delivery of Dubai Crude Oil denominated in SGD. The lowest two layers of each PSDL illustrate stored data and operations are over a time sequenced exogenous data item; values are drawn from one or more internet data streams containing the requisite commodities and currency values. The topmost layer is a descriptive difference layer, where −1 may be used to indicate a delivery obligation, and where +1 may be used to indicate an obligation to take delivery; descriptive difference layers may be used to change the direction and responsiveness to one or more exogenous data items. The disclosed embodiment is not expected to alter the quantities, prices, or types of commodities which might be transacted and monitored in a computer system organized to manage and monitor commercial trade. However, the disclosed embodiment is expected to materially decrease the storage and transmission requirements of related distributed ledger networks and computer systems. Further, the centralized or decentralized storage of the PSDL data and operations is expected to material increase the network security of the computer systems and networks.

Figure 6:
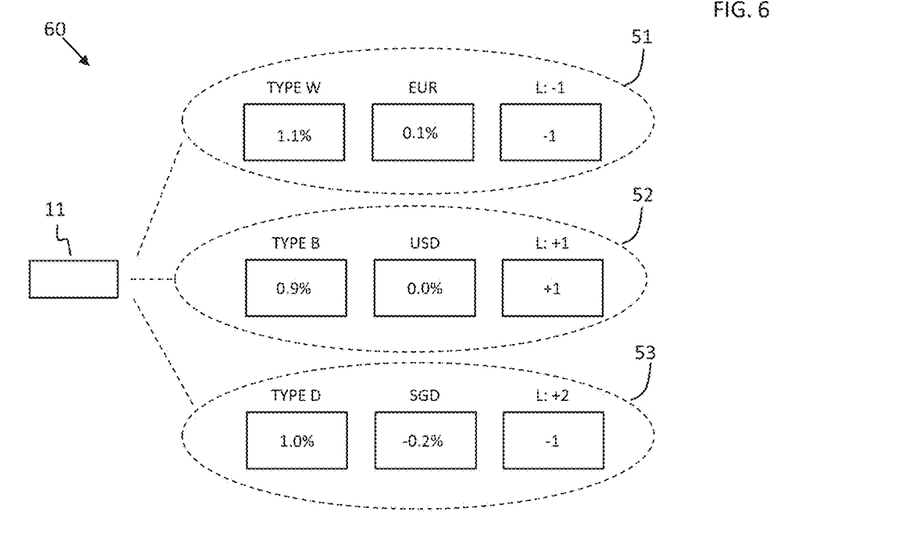
FIG. 6 illustrates examples of three real world applications.

Moving to FIG. 6 diagram 60, values of differences are illustrated for PSDL 51, PSDL 52, and PSDL 53. The value of differences is generated by the system from one of more internet data streams, and where practical, the values of differences are generated, stored, and linked with a frequency which matches or exceeds the frequency used for appending transactions records to the base DCL 11 during periods in which the values of difference published in an internet data streams are changing. In each case, the value differences illustrated for TYPE W, TYPE B, TYPE D, EUR, USD, and SGD are differences in percentage changes from the immediately preceding period; in alternate implementations, absolute values or other measured changes may be generated, stored and applied. The value differences in the right-most layer of each PSDL are descriptive value differences which may indicate a relative directionality or degree of difference application. For clarity, one PSDL is generally applied to only one base DCL, however a single PSDL may have more stored layers than are indicated in the figures.

Continuing with FIG. 6 diagram 60, one example of applying a PSDL to the units of the base DCL 11 is through the use of computer mathematic operators, where each layer's numerical difference storage layer is applied to produce an aggregate impact. Beginning with PSDL 51, the base DCL 11 units can be modified in one example by using a multiplication operator for each layer, where the units are modified by the product of: 1.1% (Type W), 0.1% (EUR), and −1 (L:−1) for a modification of −1.012011% (1.011× 1.001×−1). Applying the same operator to PSDL 52 and PSDL 53 results in 1.009%, and −1.00798% respectively. For clarity, the base DCL is stored and transacted independent of the PSDL storage. Also for clarity, PSDL storage may impart absolute values (where absolute values are subject to differences over time sequences), descriptive characteristics, or a mix of absolute values, relative values, and descriptors. The mathematical functions, operators and results are incidental to the disclosed embodiment's storage and processing and not central to the operation of the specialized system or storage design. The PSDL modifications may be electronically published over a network or internet such that holders or transactors can monitor aggregate modifying impacts, and the impact of PSDL modification may be coupled with the base DCL to direct reporting to holders, transactors, and other participants. Importantly, the system data, differences, and processes of the PSDLs is not propagated through or contained in the transaction ledger.

Figure 7:
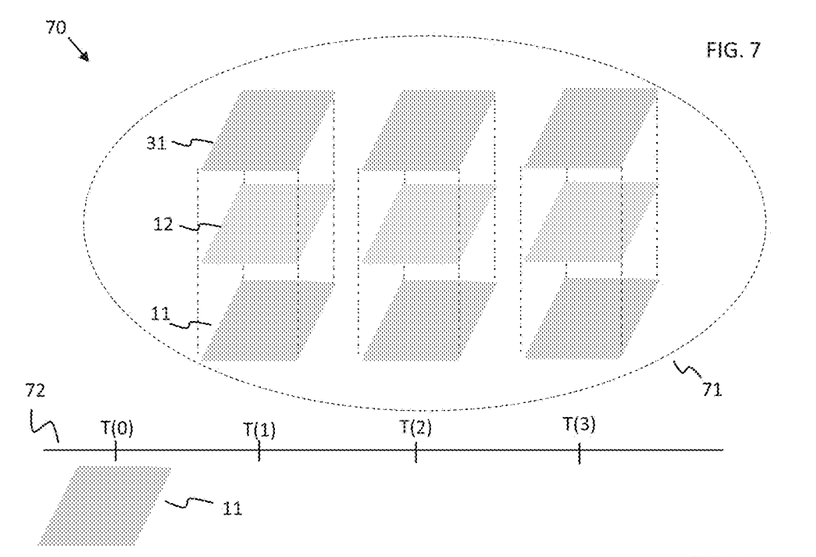
FIG. 7 illustrates an example of a time sequenced storage and linkage relationship between a base ledger and a related storage array of differentials.

FIG. 7 diagram 70 is an example of alternative alignments of PSDL data storage 71, and base DCL data storage 11. Timeline 72 indicates a starting time of T(0) and three forward time intervals indicated as T(1), T(2), and T(3). PSDL data storage 71 is an aggregation of individual PSDL layers 12, 13, and 31. In diagram 70, the units of the base DCL 11 are impacted by forward-looking or advance values and differences of three PSDLs. Importantly, the PSDL data and processes are not stored in the base DCL nor is the PSDL data and processes redundantly distributed throughout nodes of the network as are known methods such as smart contracts and colored coins.

Figure 8:
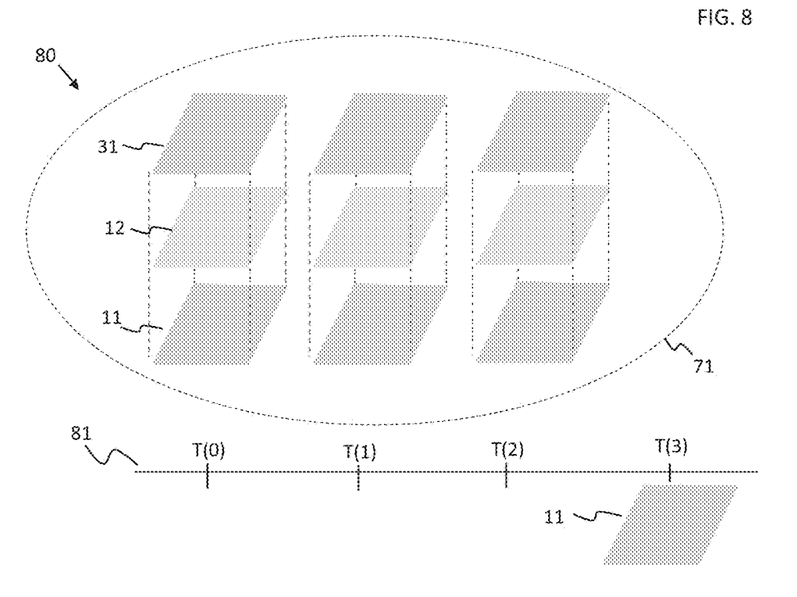
FIG. 8 illustrates a second example of a time sequenced storage and linkage relationship between a base ledger and a related storage array of differentials.

FIG. 8 diagram 80 is a second example of an alternative alignment of PSDL storage 71, and base DCL storage 11. Timeline 81 indicates a starting time of T(0) and two additional arrears time intervals indicated as T(1), T(2), and a current time of T(3). PSDL data storage 71 is an aggregation of individual PSDL layers 12, 13, and 31. In diagram 80, the units of the base DCL 11 are impacted by backward-looking or arrears values and differences of three PSDLs. Relating to diagrams 70 and 80, because non-transaction record data is not distributed through all nodes of the network, but rather is separately and centrally stored in a modular framework, functionality and utility is materially increased because PSDL are limited in distribution and modular, transaction and speeds are improved because only transaction records need be fully distributed, and security is enhanced because transaction records can benefit from an immutable sequencing on the ledger, and operative differences PSDL data and processes can be stored on secured centralized or decentralized systems.

Figure 9:
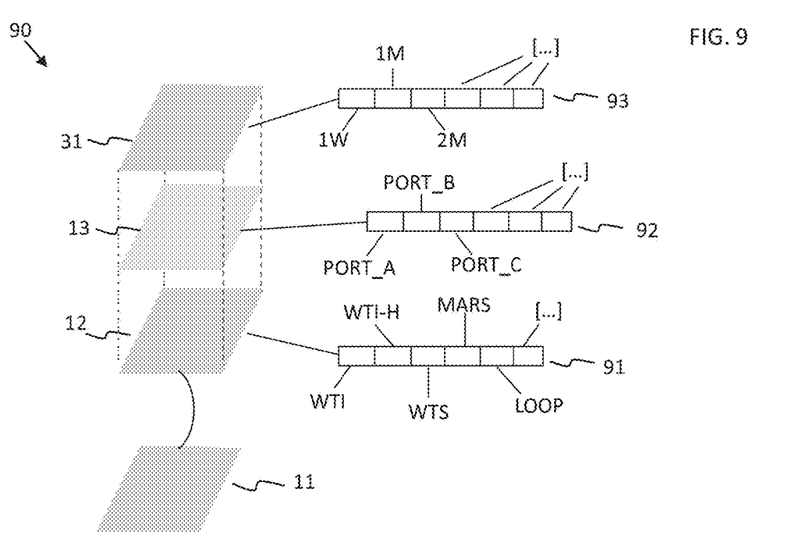
FIG. 9 illustrates an example of a multilevel mixed differences storage array in an example of shipping, goods in transit, and international trade.

Referring briefly to FIG. 9, a base computerized ledger (11) is operatively linked to parallel and modular differences of factors one through three (91, 92, and 93 respectively, stored in parallel storage of differences layers 11, 12, and 31 respectively) over a multi-time period measured and stored differences, only the single record indicated at base computerized ledger 11 is transmitted across the multiple nodes of the electronic network; the parallel and modular differences of factors are centrally stored, not distributed with the transactions ledger, and accessed only when units (or interests) underlying the base computerized ledger (11) are subject to a resolution, disposition, valuation, settlement, distribution or another action requiring differentials and descriptors. FIG. 9 is an illustration of one particular implementation where highly reduced storage and high functionality is achieved. Based on 3 modular levels of parallel storage, each containing 6 stored attributes, $6^3$ or 216 unique applications are available with one base computerized ledger data structure 11, and data transmission requirements and storage redundancy is minimized. In contrast, units of known distributed electronic ledgers are homogeneous; one bitcoin or Ethereum coin is identical to any other and the addition of features using known methods where additional items are added to the blocks (or other sequential records) expand the block storage and transmission overhead exponential and cause an increase is the amount of redundant data which propagates throughout network nodes.

FIG. 9, diagram 90 illustrates an example of the storage of illustrative PSDLs 12, 13, and 31. Diagram 90 is an example of the PSDL storage and operation over base DCL 11, where a PSDL may contain value differences or descriptive differences. The PSDLs in the example relate to a real world example of oil trade in which PSDL 12 indicates a type of crude oil (WTI, WTI-H, WTS, MARS, LOOP indicated at 91), PSDL 13 indicates a port (or delivery) location (PORT_A, PORT_B, PORT_C indicated at 92), and PSDL 31 indicates a delivery time or delivery cycle (1 W, 1 M, 2 M indicated at 93). PSDL 12, PSDL 13, and PSDL 31 all operate over the units or interests of the base DCL 11, however all storage relating to the PSDL data is not stored in the base DCL, but rather is stored centrally and linked to the resultant transaction records of the base DCL. One example of value differentials for oil type 91 is a storage of time-sequenced price values where the prices of one or more of the oil types is recorded in the PSDL for the storage and application of differences. Another example for oil type differentials 91 is the use of descriptive differentials relating to oil types 91, where the system stores and applies strings or binary encoding rather than basic numerical values; a string example is "WTI-H", and the binary descriptive coding is 01000 to indicate the second oil type in a list of five.

Figure 10:
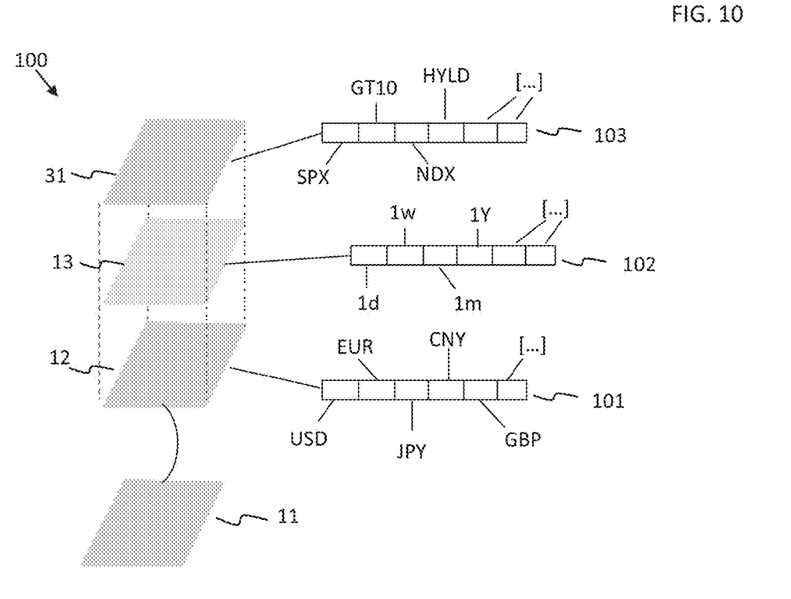
FIG. 10 illustrates an example of a multilevel mixed differences storage array in an example of an electronically tradable instrument.

FIG. 10 diagram 100 is an extended example of diagram 90, which illustrates an implementation in the context of the creation a range of bespoke instruments over a base DCL 11 with 3 parallel storage of difference layers. In diagram 100, the lowest storage layer 12 is a differences of currencies, where the currencies indicated in a selector 101 are U.S. Dollar (USD), Euro (EUR), Japanese Yen (JPY), Chinese Yuan (CNY), and British Pound Sterling (GBP); storage layer 12 can contain descriptive differences (e.g. which among the group of currencies is indicated), stored value absolute differences for relating to absolute values such as foreign exchange rates in a time sequence, or relative change or percentage differentials in a time sequences; descriptive differentials may be stored and indicated as indicators, indicator flags, binary values, or character strings. PSDL 13, the second storage layer is used to indicate tenor of an actual or synthetic position desired for the aggregate PSDL (where the aggregate PSDL is the combination of storage levels 12, 13, and 31). Relating to PSDL 13, selector 102 can indicate "1 d", "1 w", "1 m", "1 Y" (1 day, 1 week, 1 month, and 1 year respectively). Relating to PSDL 31, selector 103 references specific instruments which can be stored as description differences or time sequenced differences of absolute values or relative percentage changes. Selector 103 can indicate and store SPX, GT10, NDX, or HYLD (an equity market index, a bond index, a tech equity index, and a credit index respectively).

Figure 11:
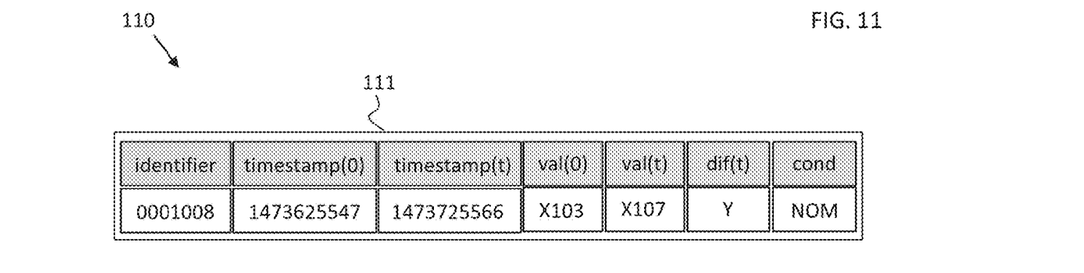
FIG. 11 is a table illustration that is an example of exogenous differential array storage of a single item with an example record format.

FIG. 11 diagram 110 is an example of a system storage record which may be stored within a PSDL. Table 111 indicates an example of a particular record where the fields are indicated as "identifier", "timestamp(0)", timestamp(t)" "val(0)", "val(t)", "dif(t)", and "cond". Identifier is an example of an encoding which is used to identify the subject of the stored differentials or descriptors. Timestamp(0) and timestamp(1) indicate the beginning and ending timestamps of a computer system or network time (and the related period) over which the stored difference is based. Val(0) and val(1) indicate the respective values of the subject item taken from an electronic published data stream, where val(0) relates to timestamp(0) in observation time, and where val(1) related to timestamp(1) in observation time. Dif(t) is an example of a numerical difference over the subject data stream object from timestamp(0) to timestamp(1). The field "cond." may be used to indicate successful retrieval from an internet data stream. The values and forms of values in table 111 are examples; implementations may present different record architecture, different stored data items, and different types of values.

Figure 12:
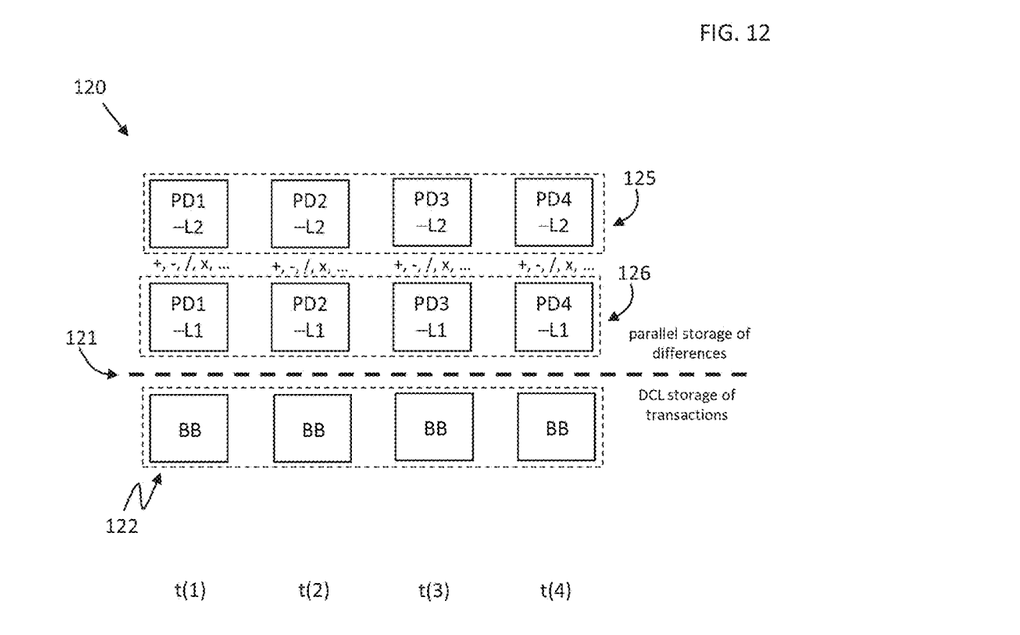
FIG. 12 illustrates relative storage locations and functional alignments between distributed computerized ledgers and parallel storage of differences layers.

FIG. 12 diagram 120 illustrates the separation of storage of the base DCL 122 and the PSDL layers 125 and 126. Line 121 illustrates the dividing line of storage where items above the line are stored on the system in centralized or decentralized storage, and those items below the line are stored in a distributed ledger. Diagram 120 is an example of the modularity of the system, and two PSDLs are illustrated at 125 and 126 respectively. The single base DCL (labelled "BB" or base block records) is indicated at 122. In each of the four columns of diagram 120, the base DCL 122 may be impacted by each PSDL 126 and PSDL 125 vertical pair individually, where each time-sequenced entry in the aggregate PSDL is independent from the others, or the base DCL 122 may be impacted by the PSDL 126 and PSDL 125 aggregate PSDL in a cumulative or compounding manner, where the impact is cumulative as time moves from left to right as indicated by the time indicators t(1), t(2), t(3), and t(4).

Figure 13:
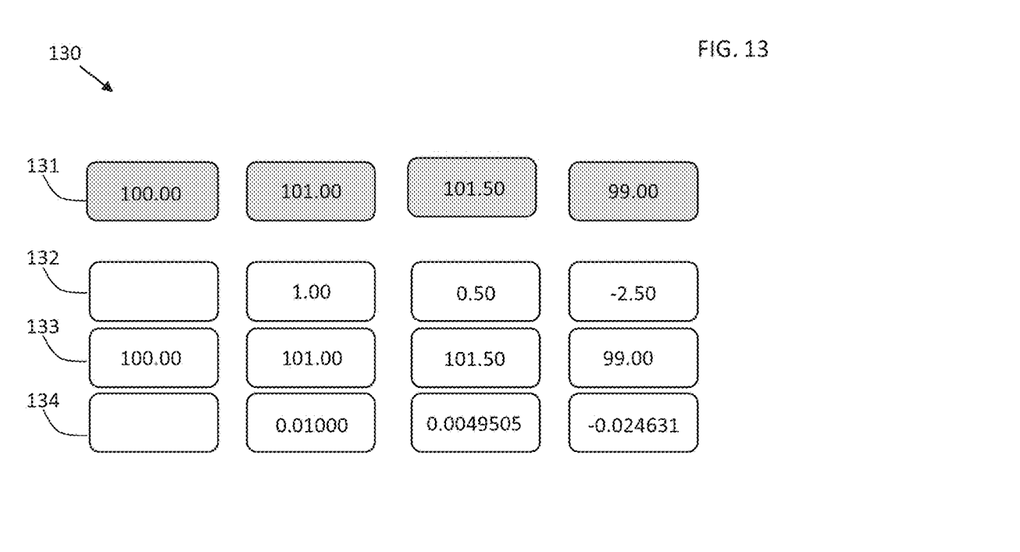
FIG. 13 illustrates a sample range of parallel storage of difference layer data types.

FIG. 13 diagram 130 illustrates an example of differentials stored and processed by the system, where differentials are based on any mathematical or computer operator. Row 131 illustrates a time sequenced vector of values equal to 100, 101, 101.5, and 99. Rows 132, 133, and 134 are illustrations of differentials stored and processed by the system. In the example of row 132, the system stores and processes differentials based on value change; value changes may be based on differences or absolute values. In the example of row 133, the system stores and processes changing time sequenced values as the value of the time sequenced different and changing values. In the example if row 134, the system stores and processes the values as percentage differences based on the immediately preceding value.

Figure 14:
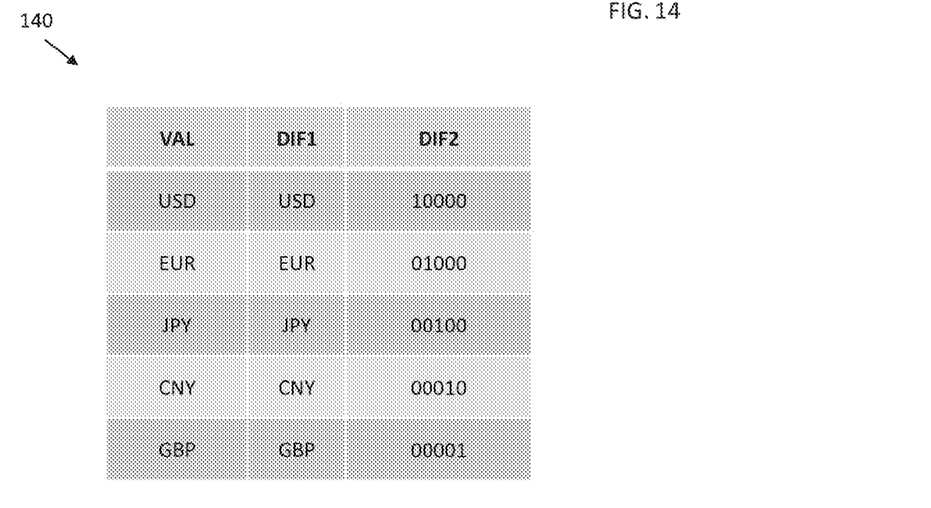
FIG. 14 is a table that illustrates descriptive and binary string storage.

FIG. 14 diagram 140 illustrates an example of differentials where differentials are descriptive. As illustrated in the table of diagram 140, the first column entitled "VAL" lists a set of unique string values "USD", "EUR", "JPY", "CNY", and "GBP". As illustrated in the example of the column entitled "DIF1", the differentials stored and processed by the system may be the actual string values which differ within the set of values (i.e. the differential descriptor). As illustrated in example of the column entitled "DIF2", the differentials stored and processed may be an indicator, flag, or binary string which indicates a value out of a set; where the set is comprised of 6 values, "100000" may be used to indicate the first value ("USD"), and "000001" may be used to indicate the last value "GBP". The remote and linked storage of descriptive items can be used to transform the nature of units within a base DCL or to strategically discriminate within the units for specialized remote processing or handling; units become representative of other items such as an industrial good, a commodity, or an airline ticket, and units within the block can be further discriminated by time or other transaction record parameters.

Figure 15:
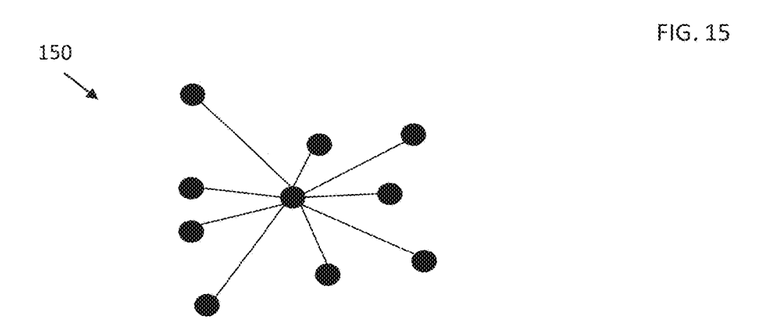
FIG. 15 is a diagram a basic centralized computerized ledger.

FIG. 15 diagram 150 is an example of a centralized network, as such term is used in the disclosed embodiment. Generally, all nodes in the network connect in a centralized manner to a central point or hub. Security in a centralized network is generally based on securing the media, device, and operating processes at the central point, and limiting write, modification and certain read access at the centralized point. Centralized networks enjoy the security advantage of having limited points or vulnerability, however, centralized networks can become highly compromised if the central point is breached.

Figure 16:
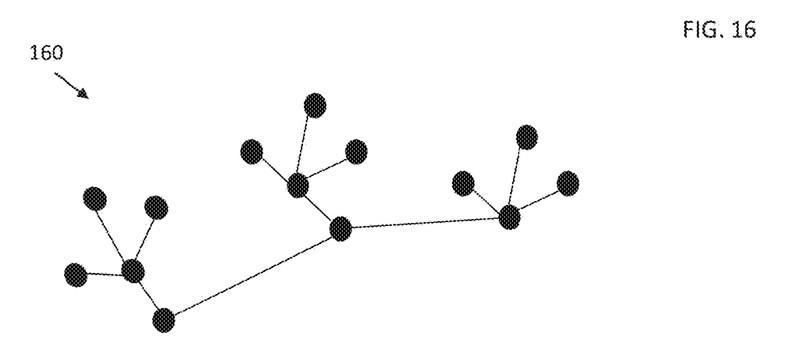
FIG. 16 is a diagram a basic decentralized computerized ledger.

FIG. 16 diagram 160 is an example of a decentralized network as such term is used in the disclosed embodiment. Generally, there are a number of central or connecting points at which individual nodes may connect. Similar to a centralized network, security in a decentralized network is generally based on securing the media, device, and operating processes at the common connection points, and limiting write, modification, and certain read access at the decentralized points.

Figure 17:
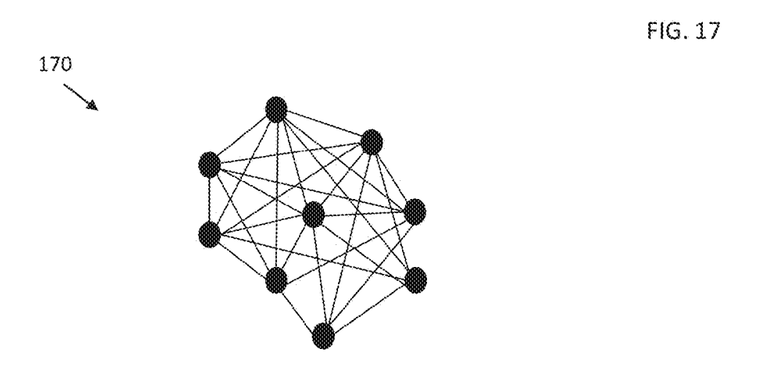
FIG. 17 is a diagram a basic distributed computerized ledger.

FIG. 17 diagram 170 is an example of a distributed network as such term is used in the disclosed embodiment. Generally, each individual node is connected (or capable of being connected) to every other node in the network. Implementations of distributed computerized ledgers are generally configured in a manner similar to FIG. 17. Security in a distributed network is often achieved through cryptographic techniques within a ledger in combination with a consensus system for validating transaction records written and appended to the ledger. Further, diagram 170 is an illustrating example of the configuration of one base DCL, where a ledger of transaction records is distributed among connected computer nodes. For clarity, intermediary nodes may be used as surrogates for discrete nodes, where such intermediary nodes are exchanges or other intermediary service providers who hold interests in a base DCL for limited periods of time or for rapid collective settlement.

Figure 18:
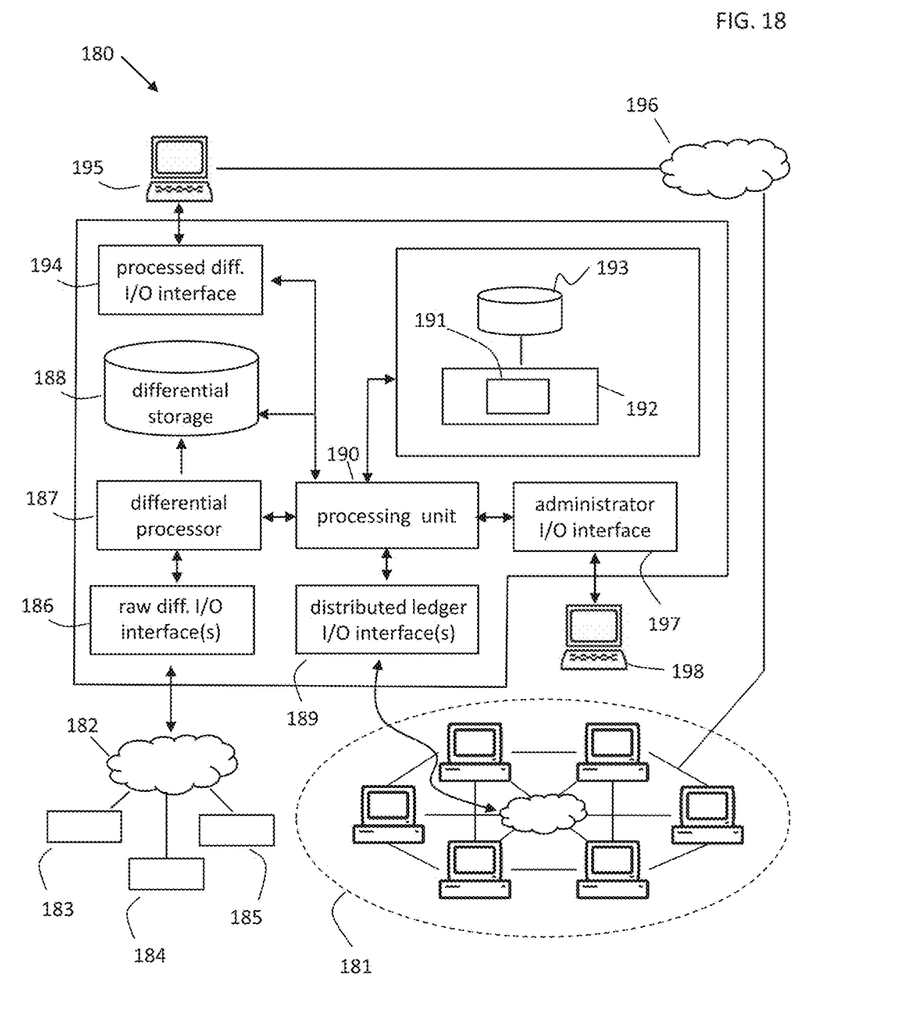
FIG. 18 is a schematic diagram which depicts the internet and network connectivity of the system hardware including the differentials processor, differentials storage, and system non-transitory computer medium and internet linkage to nodes and networks.

Referring to FIG. 18 diagram 180, it is to be understood that the disclosed embodiment includes storage of differentials and processing of differentials computer node 191, where differentials and storage processing software is stored on system RAM 192. The system software instructs the system continuously relating to all aspects of the differentials storage, including processing and storage of each modular PSDL, interconnectivity with at least one time-sequenced electronically published data stream or descriptive differential, and linkage to at least one base DCL. The differentials computer node 191 and related RAM may also be linked to a differentials computer node storage device 193.

Continuing with FIG. 18, an example of a base DCL is indicated at 181 where the separate computing nodes of a network are interconnected through the internet or a network, and where a ledger of transactions is distributed across the network. An example of the base DCL connection with the rest of the system is indicated at the distributed ledger I/O interface(s) 189, where the distributed ledger I/O interface(s) 189 may operate in both a transmission and receiving mode. The distributed ledger I/O interface(s) 189 is further connected to a system processing unit 190.

Continuing with FIG. 18, an example of a raw differential I/O interface(s) 186 is connected through an internet connection 182 for the purposes of retrieving one or more time-sequenced electronically published data streams or a descriptive differentials, where a time-sequenced data stream may relate to prices, trade flows, trade variables, shipping details, economic variables, performance measures or other numerical or descriptive data. Examples of source nodes connected to the internet include: (i) a commercial trade, tracking, or shipping network run by a company, industry group, or governmental entity 183, (ii) an electronic exchange 184 which publishes a price data stream of changing market prices, and (iii) an electronic news outlet 185 which publishes electronic data relating to changing news. Continuing to the differential processor 187, the differential processor 187 assimilates at least one value or descriptive differential through a computer or mathematical operation, forming the data into a useable format where it can be stored on differential storage unit 188, for simultaneous or subsequent application to the units or interests of a base DCL with network 181. Continuing with the processing of differentials, the system processing unit 190 is connected to the differential processor and the differentials computer node 191 such that the system can effect differential data transmissions and responses to differential data queries through a processed differential data I/O interface 194 which is controlled by a differentials administration gateway terminal 195. An example of processed differential transmission, dissemination, and query management is illustrated at internet connection 196 in which the system can both broadcast processed differential data and respond to queries. When a unit or interest of the base DCL requires valuation, settlement, exchange, or resolution, the system can be polled for a valuation or impact on a unit, record, or interest of the DCL as of a particular time, or over a particular period of time.

Continuing with diagram 180, an example of an administrator interface 197 is controlled by an administrator console 198, where the specifications of PSDLs, related exogenous data streams, and connectivity to a base DCL is established, controlled, and modified.

The disclosed embodiment is a system, method, and computer readable storage medium related to the systems, network connectivity, software, and data storage architecture in applications over computerized ledgers. The disclosed system, method and computer readable storage medium is directed at a range of computerized ledgers, including distributed ledgers, decentralized ledgers, and centralized ledgers, where computerized ledgers store and report encrypted, or otherwise secured, electronic transactions. The disclosed system, including its data storage features, computer readable storage medium, and methods are directed at universal solutions to improve the efficiency and utility of computers and networks operating computerized ledgers.

The above disclosed embodiments are not intended to limit the scope of the invention but are examples thereof. Although the invention herein has been described with reference to particular embodiments, it is to be understood that these embodiments are merely illustrative of the principles and applications of the present invention. The above disclosed embodiments were chosen and described to most clearly explain the principles of the invention and practical applications, and to enable others skilled in the art to understand the invention for various embodiments. It is therefore to be understood that numerous modifications may be made to the illustrative embodiments and that other arrangements may be devised without departing from the scope and spirit of the present invention as defined by the appended claims.

What is claimed:

1. A computer based method comprising:
   creating at least one electronic parallel storage of a differences layer linked to a distributed computer ledger (DCL); the DCL contains an electronic transaction record by a time-sequenced value or a time-sequenced string;
   accessing and storing a value through the at least one electronic parallel storage of the differences layer, the value from a group comprising of at least one time-sequenced electronically published data stream and at least one descriptive differential, wherein at least one differences processing engine running on a specialized computer system creates and stores parameters from a group comprised of a measurement differences and a descriptive differences;
   storing the DCL containing an electronic transactions record on at least one of a distributed network of connected independent computers or a decentralized network of computers wherein the electronic transaction record is time sequenced, and a writing or an appending of the electronic transaction records is performed on the distributed network of connected independent computers or the decentralized network of computers;
   storing the at least one electronic parallel storage of the differences layer on at least one of a centralized storage device controlled by the specialized computer system or a decentralized storage device controlled by the specialized computer system for increasing functionality and utility of the DCL, reducing data storage requirements, eliminating transmission of redundant data, and improving data security;
   linking the electronic transaction record in the DCL to records of the at least one electronic parallel storage of the differences layer utilizing at least one time sequenced value, string, code, or key; and
   imputing at least one measured differential with a descriptive identifier or at least one descriptive identifier to the electronic transaction record of the DCL through data storage and processing on the at least one electronic parallel storage of the differences layer.

2. The method of claim 1, wherein records of the at least one electronic parallel storage of the differences layer are written and stored separately from the distributed electronic ledger containing electronic transaction records, where the records of the at least one electronic parallel storage of the differences layer are encoded for time-sequenced alignment with the electronic transaction records when values from a group comprised of the at least one time-sequenced electronically published data stream and the at least one descriptive differential change in value or specification.

3. The method of claim 1, wherein values and descriptors from a group comprised of the at least one time-sequenced electronically published data stream and the at least one descriptive differential alter the functionality and transactional value of the electronic transaction records of the distributed electronic ledger.

4. The method of claim 1, wherein values and descriptors from a group comprised of the at least one time-sequenced electronically published data stream and the at least one descriptive differential define the functionality and operative entitlement of the electronic transaction records of the distributed electronic ledger.

5. The method of claim 1, wherein values from a group consisting of at least one time-sequenced electronically published data stream and at least one descriptive differential are linked to the electronic transaction records within the distributed electronic ledger and the electronic transaction records are homogeneous on the distributed electronic ledger as identified by a timestamp or other unique record identifier.

6. The method of claim 1, wherein layers of the at least one electronic parallel storage of the differences layer linked are modular and changeable independent of the distributed electronic ledger containing electronic transaction records.

7. A system comprising:
a system having a memory device, the memory device further including a Random Access Memory (RAM);
a processor connected to the memory device, the processor is configured to:
create at least one electronic parallel storage of a differences layer linked to a distributed computer ledger (DCL), both the electronic parallel storage of the differences layer and the DCL containing a respective electronic transaction record, a time-sequenced value, or a time-sequenced string;
access a value from a group comprising of at least one time-sequenced electronically published data stream and at least one descriptive differential;
store the values from a group comprising of at least one time-sequenced electronically published data stream and at least one descriptive differential on the at least one electronic parallel storage of the differences layer;
align and link a stored value record of the at least one electronic parallel storage of the differences layer to the electronic transaction record of the DCL utilizing at least one time sequenced value, string, code, or key; and
impute at least one measured differential with a descriptive identifier or at least one descriptive identifier to the electronic transaction record of the DCL.

8. The system of claim 7, wherein the memory device includes a separation of storage of the differences layer.

9. The system of claim 8, wherein the separation of storage is between the electronic transaction record of the DCL and the differences layer.

10. The system of claim 9, wherein a plurality of differences layer is parallel stored to create a parallel storage of differences layer (PSDL).

11. The system of claim 7, wherein the difference layer is stored on a centralized storage or a decentralized storage apart from the electronic transaction record of the DCL.

12. The system of claim 11, wherein the electronic transaction record of the DCL is impacted by a parallel storage of differences layer.

13. The system of claim 12, wherein impact is done from each of the parallel storage of differences layer (PSDL) in an individual manner.

14. The system of claim 13, wherein the parallel storage of differences layer (PSDL) has a time-sequence entry, and each time-sequenced entry is independent in the PSDL.

15. The system of claim 12, wherein impact is done from the parallel storage of differences layer (PSDL) in a cumulative manner, or a compounding manner, wherein impact is cumulative based on a time indicator.

16. The system of claim 15, wherein the parallel storage of differences layer (PSDL) has a time-sequence entry, and each time-sequenced entry is independent or dependent in the PSDL.

17. The system of claim 7, wherein the difference layer is stored on a distributed network, a centralized network, or a decentralized network, and wherein the difference layer is stored apart from the electronic transaction record of the DCL.

18. The system of claim 17, wherein the electronic transaction record of the DCL is impacted by the differences layer.

19. A non-transitory computer readable storage medium, comprising storage, retrieval, modification, and linking system software which instructs at least one computer processor residing on a specialized computer system to implement a process to:
create at least one electronic parallel storage of a differences layer linked to a distributed computer ledger (DCL) containing an electronic transaction record arranged by a time-sequenced value or time-sequenced string, wherein the at least one electronic parallel storage of the differences layer accesses and stores values from a group consisting of at least one time-sequenced electronically published data stream and a list of descriptive differentials, and wherein at least one differences processing engine running on a specialized computer system creates and stores parameters from a group consisting of measurement differences and descriptive differences;
store the DCL containing the electronic transactions records on at least one of a distributed network of connected independent computers or a decentralized network of computers wherein the electronic transaction records are time sequenced, and the writing or appending of the electronic transaction records is performed on the distributed network of connected independent computers or the decentralized network of computers;
store the at least one electronic parallel storage of the differences layer on at least one of a centralized storage device controlled by the specialized computer system or a decentralized storage device for increasing functionality and utility of the DCL, reducing data storage requirements, eliminating transmission of redundant data, and improving data security;
link the transaction records in the DCL to the at least one electronic parallel storage of the differences layer utilizing at least one time sequenced value, string, code, or key; and
impute at least one measured differential with a descriptive identifier or at least one descriptive identifier to the electronic transaction records of the DCL, wherein a data storage and a processing of the imputing resides on a centralized device or a decentralized device controlled by the specialized computer system.

20. The non-transitory computer readable storage medium of claim 19, wherein the difference layer is stored apart from the electronic transaction record of the DCL, and the electronic transaction record of the DCL is impacted by the differences layer.

* * * * *